Dec. 1, 1936. E. J. CANEPA 2,062,967
MEANS FOR OPERATING COVERS OF KITCHEN BOILERS
Filed Aug. 26, 1935
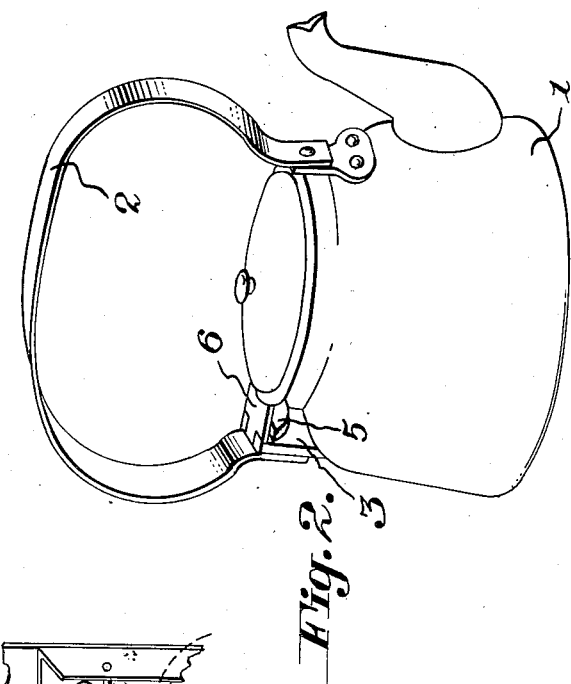
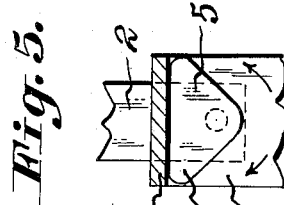
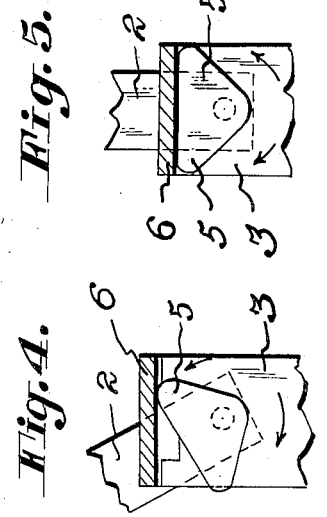
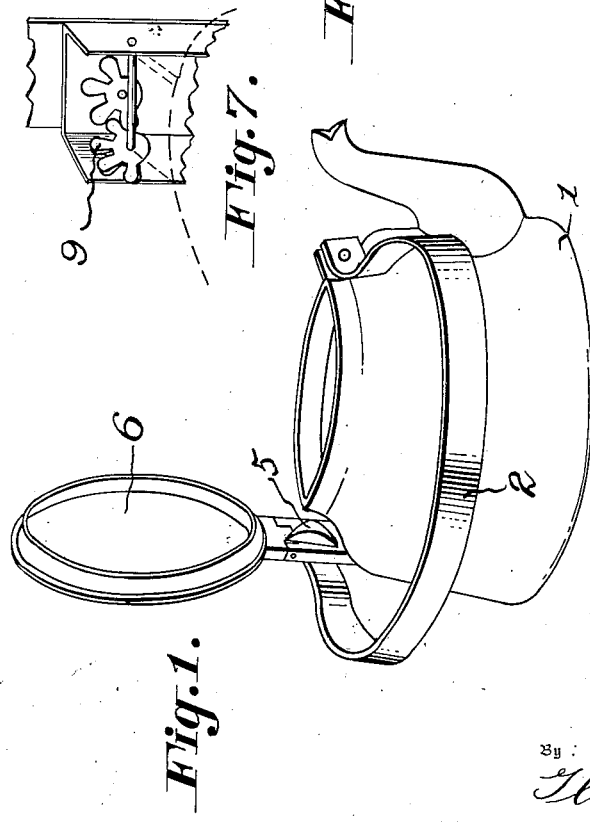
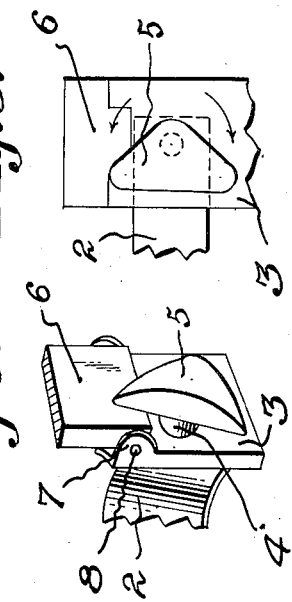
Inventor
*E. J. Canepa*
By:
*Hascock Downing & Seebold*
Attorneys.

Patented Dec. 1, 1936

2,062,967

UNITED STATES PATENT OFFICE 2,062,967

MEANS FOR OPERATING COVERS OF KITCHEN BOILERS

Enrique Julio Canépa, Buenos Aires, Argentina

Application August 26, 1935, Serial No. 37,997
In Argentina August 31, 1934

3 Claims. (Cl. 53—9)

This invention relates to improvements in kettle operating mechanisms and distinguishes itself chiefly by the fact that the handle is provided with a means, such as a gearing or a star-like device, which by frictionally engaging an extension of the lid will link up the motion of the first-named with that of the latter whereby the opening of the lid correlatively to the motion of the handle is brought about.

In order that the present invention may be fully understood and readily put into practice various embodiments of the same are shown by way of example in the accompanying drawing wherein:

Figure 1 is a perspective view of the object;
Figure 2 shows the same in the same position;
Figure 3 is a plan view of the mechanism;
Figure 4 shows a position of the mechanism at the beginning of its action;
Figure 5 shows the mechanism when in its inactive state;
Figure 6 is illustrative of the most suitable form of construction, this being a perspective view, and
Figure 7 shows a mechanism in mesh.

The kettle 1 has its handle 2 arranged in such a manner that at the inside of the support 3 which constitutes the fulcrum for the rotation of the handle and fixed to the shaft 4 in a perfectly firm way there is provided a triangle 5 which might just as well be a gearing 6 and which reproduces all of the motions of the handle inasmuch as it forms part of the same. Thus, since the handle describes an operative rotation of approximately 180° the triangular piece 5 is utilized which upon reaching the position illustrated by Figs. 1 and 3 will have impelled the lid to the situation of major aperture, the lid 6 to this end being connected or hinged to the aforesaid support 3 by means of an appendix 7 having a more suitable outer portion and constituting a shaft at 8. It is easy now to appreciate how the action of the handle 2 synchronically operates the lid 6. The starting point is clearly indicated in Fig. 5; the triangle 5 has its base registering with the inner surface of the appendix 7, the lid covering in this case the aperture of the kettle, as may be seen also from Fig. 2, that is to say, it is in a horizontal position. Thus, upon moving downwardly the handle 2 (Fig. 4) and together therewith the triangle 5, one of its vertices commences to rub on the innner surface of the appendix 7 and, as a consequence thereof, this appendix acts as a shaft at 8 and proceeds to lift the lid until the same reaches the position indicated in Figs. 1 and 3 in which the handle is horizontal and the lid is vertical.

When using gearings, the appendix 7 is coupled to the gearing 9, the motion of the handle then being transmitted to the gearing 6 and through 9 to the lid.

I claim:

1. A kettle comprising a body provided with a mouth, lugs on the body positioned exteriorly of the mouth and arranged at opposite sides of the mouth, a cover for said mouth having a laterally extending arm hingedly connected to one of said lugs, a bail handle having its ends pivotally connected to the lugs, and means mounted on one of said lugs, movable with the handle, and cooperating with the arm for raising the cover to a vertical position at one side of said mouth when the handle is moved from a substantially vertical position to a substantially horizontal position.

2. In a kettle of the character described having oppositely disposed lugs carried thereby, a cover for said kettle, an arm extending laterally from said cover and hingedly connected to one of said lugs, a handle bail, pivot pins extending through the lugs and connecting the ends of the bail to said lugs, and means fixed to one of said pins and engageable with the arm for raising the cover when the handle is shifted in one direction about the axis of the pivot pins.

3. In a kettle of the character described having oppositely disposed lugs carried thereby, a cover for said kettle, an arm extending laterally from said cover and hingedly connected to one of said lugs, a handle bail, pivot pins connecting the ends of said bail to said lugs, and cam means fixed to one of said pins and engageable with the arm for raising the cover when the handle is shifted in one direction about the axis of the pivot pins, said last mentioned means being arranged between the wall of the kettle and the lug carrying the last mentioned pivot pin.

ENRIQUE JULIO CANÉPA.